US012633580B2

(12) United States Patent
Jang et al.

(10) Patent No.: US 12,633,580 B2
(45) Date of Patent: May 19, 2026

(54) VEHICLE CONTROL DEVICE AND METHOD THEREOF

(71) Applicants: Hyundai Motor Company, Seoul (KR); Kia Corporation, Seoul (KR)

(72) Inventors: Hyun Jun Jang, Hwaseong-si (KR); Woo Sung Kim, Hwaseong-si (KR); Min Jun Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 37 days.

(21) Appl. No.: 18/817,982

(22) Filed: Aug. 28, 2024

(65) Prior Publication Data

US 2025/0260075 A1 Aug. 14, 2025

(30) Foreign Application Priority Data

Feb. 13, 2024 (KR) ........................ 10-2024-0020512

(51) Int. Cl.
| | |
|---|---|
| *H01M 10/42* | (2006.01) |
| *G07C 5/08* | (2006.01) |
| *H01M 10/48* | (2006.01) |
| *B60L 58/16* | (2019.01) |

(52) U.S. Cl.
CPC ........ *H01M 10/425* (2013.01); *G07C 5/0808* (2013.01); *H01M 10/482* (2013.01); *B60L 58/16* (2019.02); *H01M 2010/4271* (2013.01); *H01M 2220/20* (2013.01)

(58) Field of Classification Search
CPC ............. H01M 10/425; H01M 10/482; H01M 2010/4271; H01M 2220/20; G07C 5/0808; B60L 58/16; B60L 2240/547; B60L 3/0046; B60L 2240/545; G01R 19/16542; G01R 19/16576; G01R 31/382; B60Y 2200/91; Y02T 10/70
See application file for complete search history.

(56) References Cited

U.S. PATENT DOCUMENTS

2023/0168308 A1* 6/2023 Ryu ..................... G01R 31/392

OTHER PUBLICATIONS

Jufeng Yang, et al. "Online state-of-health estimation for lithium-ion batteries using constantvoltage charging current analysis", Version of Record: https://www.sciencedirect.com/science/article/pii/S0306261918300102, (Applied Energy, 2018).

* cited by examiner

*Primary Examiner* — Michael V Kerrigan
(74) *Attorney, Agent, or Firm* — MORGAN, LEWIS & BOCKIUS LLP

(57) ABSTRACT
A vehicle control device and a method thereof are provided. The vehicle control device includes a plurality of battery cells, a processor, and a memory. The processor is configured to identify first time constants of each of the battery cells, when a vehicle maintains a no-load state during a specified time, obtains a comparison dataset indicating a difference between an average value for the first time constants and each of the first time constants, and diagnoses a state of each of the battery cells, using the comparison dataset.

20 Claims, 6 Drawing Sheets

START

IDENTIFY FIRST TIME CONSTANTS OF EACH
OF A PLURALITY OF BATTERY CELLS,
IF VEHICLE MAINTAINS NO-LOAD STATE
DURING SPECIFIED TIME                    ~S410

OBTAIN COMPARISON DATASET INDICATING
DIFFERENCE BETWEEN AVERAGE VALUE FOR
FIRST TIME CONSTANTS AND EACH OF FIRST
TIME CONSTANTS                           ~S420

DIAGNOSE STATE OF EACH OF THE PLURALITY
OF BATTERY CELLS, USING COMPARISON DATASET   ~S430

END

MAINTAIN NO-LOAD STATE — S510

CELL TEMPERATURE DEVIATION < SPECIFIED TEMPERATURE OR SOH DEVIATION < SPECIFIED RATE? — S520

NO

YES

CALCULATE TIME CONSTANTS OF A PLURALITY OF BATTERY CELLS EVERY A PLURALITY OF TIME INTERVALS — S530

OBTAIN COMPARISON DATASETS EVERY THE PLURALITY OF TIME INTERVALS — S540

DIAGNOSE BATTERY CELLS USING COMPARISON DATASETS — S550

1

VEHICLE CONTROL DEVICE AND METHOD THEREOF

CROSS-REFERENCE TO RELATED APPLICATION

The present application claims priority to Korean Patent Application No. 10-2024-0020512, filed on Feb. 13, 2024, the entire contents of which is incorporated herein for all purposes by this reference.

BACKGROUND OF THE PRESENT DISCLOSURE

Field of the Present Disclosure

The present disclosure relates to a vehicle control device and a method thereof, and more particularly, relates to technologies for managing a battery cell.

Description of Related Art

Recently, with the development of electrification and autonomous driving technology, the vehicle has required a battery management system. Therefore, the accurate and stable management of the battery has emerged as a key element. For example, because a problem, such as the imbalance, overheating, or over-discharge of at least battery cell in the battery is able to affect another battery cell adjacent to the at least one battery cell, it may degrade the performance of the entire battery. Thus, there is a need to periodically monitor the battery cell and suitably manage the battery cell. However, the simple battery management system based on a parameter, such as a current, a voltage, or a temperature, may cause a problem of not providing a driver with sufficient information. Thus, to address the above-mentioned problem, there is a need to provide a battery management system capable of more accurately identifying an abnormal battery cell using a time constant associated with the battery.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control device for monitoring battery cells in a no-load state of a vehicle and a method thereof.

Another aspect of the present disclosure provides a vehicle control device for diagnosing states of battery cells using time constants for the battery cells and a method thereof.

Another aspect of the present disclosure provides a vehicle control device for identifying states of battery cells using time constants identified in each of time intervals and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control device may include a plurality of battery cells, a processor, and a memory. The processor may be configured to identify first time constants of each of the battery cells, when a vehicle maintains a no-load state during a specified time, obtain a comparison dataset indicating a difference between an average value for the first time constants and each of the first time constants, and diagnose a state of each of the battery cells, using the comparison dataset.

In an exemplary embodiment of the present disclosure, the processor may be configured to identify a second time constant outside a specified range including the average value among the first time constants, using the comparison dataset, identify a first battery cell corresponding to the second time constant, and diagnose a state of the first battery cell as an abnormal state.

In an exemplary embodiment of the present disclosure, the processor may be configured to identify a third time constant within the specified range among the first time constants, using the comparison dataset, and diagnose a state of a second battery cell corresponding to the third time constant as a normal state.

In an exemplary embodiment of the present disclosure, the processor may be configured to identify a first voltage corresponding to the first battery cell and a second voltage corresponding to the second battery cell. A difference between the first voltage and the second voltage may be outside a specified voltage range, during the specified time and may be within the specified voltage range, after the specified time.

In an exemplary embodiment of the present disclosure, the processor may be configured to obtain a normal distribution curve of the first time constants based on the average value, using the comparison dataset, and identify the specified range, using a standard deviation corresponding to the normal distribution curve.

In an exemplary embodiment of the present disclosure, the processor may be configured to divide the specified time into a plurality of time intervals, obtain a first comparison dataset in a first time interval among the plurality of time intervals, obtain a second comparison dataset in a second time interval among the plurality of time intervals, identify first abnormal battery cells diagnosed as an abnormal state using the first comparison dataset among the plurality of battery cells, identify second abnormal battery cells diagnosed as the abnormal state using the second comparison dataset among the plurality of battery cells, diagnose a state of a third battery cell as the abnormal state, when the third battery cell is included in all the first abnormal battery cells and the second battery cells, and diagnose the state of the third battery cell as a normal state, when the third battery cell is included in the first abnormal battery cells or the second battery cells.

In an exemplary embodiment of the present disclosure, the processor may be configured to identify a maximum time constant and a minimum time constant among the first time constants of each of the battery cells, exclude fourth time constants adjacent to at least one of the maximum time constant or the minimum time constant, based on a specified number, from the first time constants, and identify the average value, using the first time constants excluding the fourth time constants.

In an exemplary embodiment of the present disclosure, the processor may be configured to identify temperatures for each of the battery cells, when the vehicle maintains the no-load state during the specified time, and identify the first time constants, when a difference between a maximum temperature and a minimum temperature among the temperatures is less than or equal to a specified temperature.

In an exemplary embodiment of the present disclosure, the processor may be configured to identify a plurality of states of health (SOHs) indicating remaining life of each of the battery cells, if the vehicle maintains the no-load state during the specified time, and identify the first time constants, if a difference between a maximum SOH and a minimum SOH among the plurality of SOHs is less than or equal to a specified rate.

In an exemplary embodiment of the present disclosure, the first time constants may include information indicating intensity of a voltage corresponding to each of the battery cells and fluctuation in the voltage over time.

In an exemplary embodiment of the present disclosure, the no-load state may include any one of an ignition-off state of the vehicle, a parking state of the vehicle, or a stationary state of the vehicle, or any combination thereof.

According to another aspect of the present disclosure, a vehicle control method may include identifying first time constants of each of battery cells, when a vehicle maintains a no-load state during a specified time, obtaining a comparison dataset indicating a difference between an average value for the first time constants and each of the first time constants, and diagnosing a state of each of the battery cells, using the comparison dataset.

In an exemplary embodiment of the present disclosure, the diagnosing of the state of each of the battery cells may include identifying a second time constant outside a specified range including the average value among the first time constants, using the comparison dataset, identifying a first battery cell corresponding to the second time constant, and diagnosing a state of the first battery cell as an abnormal state.

In an exemplary embodiment of the present disclosure, the diagnosing of the state of each of the battery cells may include identifying a third time constant within the specified range among the first time constants, using the comparison dataset, and diagnosing a state of a second battery cell corresponding to the third time constant as a normal state.

In an exemplary embodiment of the present disclosure, the vehicle control method may further include identifying a first voltage corresponding to the first battery cell and a second voltage corresponding to the second battery cell. A difference between the first voltage and the second voltage may be outside a specified voltage range, during the specified time and may be within the specified voltage range, after the specified time.

In an exemplary embodiment of the present disclosure, the identifying of the second time constant may include obtaining a normal distribution curve of the first time constants based on the average value, using the comparison dataset and identifying the specified range, using a standard deviation corresponding to the normal distribution curve.

In an exemplary embodiment of the present disclosure, the diagnosing of the state of each of the battery cells may include dividing the specified time into a plurality of time intervals, obtaining a first comparison dataset in a first time interval among the plurality of time intervals, obtaining a second comparison dataset in a second time interval among the plurality of time intervals, identifying first abnormal battery cells diagnosed as an abnormal state using the first comparison dataset among the plurality of battery cells, identifying second abnormal battery cells diagnosed as the abnormal state using the second comparison dataset among the plurality of battery cells, diagnosing a state of a third battery cell as the abnormal state, if the third battery cell is included in all the first abnormal battery cells and the second battery cells, and diagnosing the state of the third battery cell as a normal state, if the third battery cell is included in the first abnormal battery cells or the second battery cells.

In an exemplary embodiment of the present disclosure, the identifying of the comparison dataset may include identifying a maximum time constant and a minimum time constant among the first time constants of each of the battery cells, excluding fourth time constants adjacent to at least one of the maximum time constant or the minimum time constant, based on a specified number, from the first time constants, and identifying the average value, using the first time constants excluding the fourth time constants.

In an exemplary embodiment of the present disclosure, the identifying of the first time constants may include identifying temperatures for each of the battery cells, if the vehicle maintains the no-load state during the specified time, and identifying the first time constants, if a difference between a maximum temperature and a minimum temperature among the temperatures is less than or equal to a specified temperature.

In an exemplary embodiment of the present disclosure, the identifying of the first time constants may include identifying a plurality of states of health (SOHs) indicating remaining life of each of the battery cells, if the vehicle maintains the no-load state during the specified time, and identifying the first time constants, if a difference between a maximum SOH and a minimum SOH among the plurality of SOHs is less than or equal to a specified rate.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
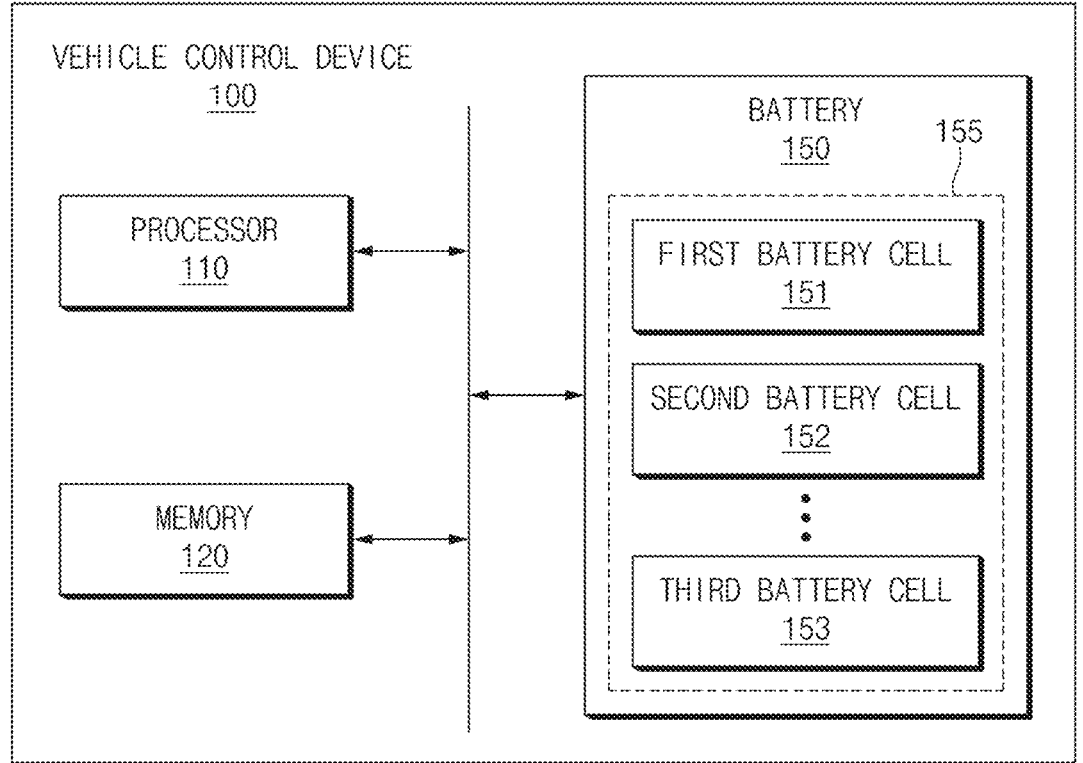
FIG. 1 illustrates an example of a block diagram associated with a vehicle control device according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical component is designated by the identical numerals even when they are displayed on other drawings. Furthermore, a detailed description of well-known features or functions will be ruled out in order not to unnecessarily obscure the gist of the present disclosure.

In describing components of exemplary embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein include the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The term "module" used in various embodiments of the present disclosure may include a unit implemented with hardware, software, or firmware, and may be interchangeably used with terms, for example, "logic," "logic block," "part," or "circuit". A module may be an integral part, or a minimum unit or portion thereof, adapted to perform one or more functions. In an exemplary embodiment of the present disclosure, the module may be implemented in the form of an application-specific integrated circuit (ASIC). According to various exemplary embodiments of the present disclosure, operations performed by the module, the program, or another component may be carried out sequentially, in parallel, or repeatedly, or one or more of the operations may be executed in a different order or omitted, or one or more other operations may be added.

Various embodiments of the present disclosure may be implemented as software (e.g., a program) including one or more instructions stored in a storage medium (e.g., an internal memory or an external memory) readable by a machine (e.g., a vehicle control device 100). For example, a processor (e.g., a processor 110) of the device (e.g., the vehicle control device 100) may invoke at least one of the stored one or more instructions from the storage medium and may execute it. This allows the machine to be operated to perform at least one function according to the at least one instruction invoked. The one or more instructions may include a code generated by a complier or a code executable by an interpreter. The machine-readable storage medium may be provided in a form of a non-transitory storage medium. Here, the term "non-transitory" simply means that the storage medium is a tangible device and does not include a signal (e.g., an electromagnetic wave), but the present term does not differentiate between where data is semipermanently stored in the storage medium and where data is temporarily stored in the storage medium.

Hereinafter, various exemplary embodiments of the present disclosure will be described in detail with reference to FIGS. 1 to 6.

FIG. 1 illustrates an example of a block diagram associated with a vehicle control device according to an exemplary embodiment of the present disclosure.

Referring to FIG. 1, a vehicle control device 100 according to an exemplary embodiment of the present disclosure may be implemented inside or outside a vehicle, and some of components included in the vehicle control device 100 may be implemented inside or outside the vehicle. In the instant case, the vehicle control device 100 may be integrally configured with control units in the vehicle or may be implemented as a separate device to be connected to the control units of the vehicle by a separate connection means. For example, the vehicle control device 100 may further include components which are not shown in FIG. 1.

The vehicle control device 100 according to various exemplary embodiments of the present disclosure may include at least one of a processor 110, a memory 120, or a battery 150. The processor 110, the memory 120, and the battery 150 may be electronically or operably coupled with each other by an electronical component including a communication bus. Hereinafter, that pieces of hardware are operably coupled with each other may mean that a direct connection or an indirect connection between the pieces of hardware is established in a wired or wireless manner so that second hardware is controlled by first hardware among the pieces of hardware. They are illustrated based on the different blocks, but an exemplary embodiment of the present disclosure is not limited thereto. Some of the pieces of hardware of FIG. 1 (e.g., at least some of the processor 110, the memory 120, and a communication circuit) may be included in a single integrated circuit such as a system on a chip (SoC).

The processor 110 of the vehicle control device 100 according to various exemplary embodiments of the present disclosure may include a hardware component for processing data based on one or more instructions. The hardware for processing the data may include, for example, an arithmetic and logic unit (ALU), a floating point unit (FPU), a field programmable gate array (FPGA), a central processing unit (CPU), and/or an application processor (AP). The number of the processors 110 may be one or more in number. For example, the processor 110 may include a structure of a multi-core processor including a dual core, a quad core, a hexa core, or an octa core.

The memory 120 of the vehicle control device 100 may include a hardware component for storing data and/or instructions input and/or output from the processor 110. The memory 120 may include, for example, a volatile memory, such as a random-access memory (RAM), and/or a non-volatile memory, such as a read-only memory (ROM). For example, the volatile memory may include at least one of a dynamic RAM (DRAM), a static RAM (SRAM), a cache RAM, or a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disc, or an embedded multi-media card (eMMC).

The battery 150 of the vehicle control device 100 according to various exemplary embodiments of the present disclosure may include a battery pack, a battery cell, and/or a battery module. For example, the battery pack may include one or more unit cells. For example, the battery module may include one or more battery cells (e.g., a first battery cell 151). For example, the battery cell may include a positive electrode, a negative electrode, and an electrolyte. For example, the battery pack may include a battery cell, a battery module, a battery management system (BMS), and/or a cooling system.

In an exemplary embodiment of the present disclosure, a plurality of battery cells 155 included in the battery 150 may include a capacitor or a secondary battery, which stores power according to charging. For example, the plurality of battery cells 155 may include the first battery cell 151, a second battery cell 152, and/or a third battery cell 153. The number of battery cells included in the plurality of battery cells 155 is limited to that shown in FIG. 1.

For example, the plurality of battery cells 155 may include any one of a lithium (Li)-ion battery, a Li-ion polymer battery, a lead-acid battery, a nickel-cadmium (NiCd) battery, or a nickel-metal hydride (NiMH) battery. However, the operation performed by the vehicle control device 100 may be performed independently of chemical properties of the plurality of battery cells 155. The plurality of battery cells 155 may supply electricity to a motor in an electric vehicle (EV) mode and a hybrid electric vehicle (HEV) mode of a vehicle and may be charged by electricity collected by the motor in a regenerative braking mode.

One or more instructions indicating calculation and/or an operation to be performed for data by the processor 110 of the vehicle control device 100 may be stored in the memory 120 of the vehicle control device 100 according to an exemplary embodiment of the present disclosure. A set of the one or more instructions may be referred to as firmware, an operating system, a process, a routine, a sub-routine, and/or an application. For example, when a set of a plurality of instructions distributed in a form of an operating system, firmware, a driver, and/or an application is executed, the vehicle control device 100 and/or the processor 110 may perform at least one of operations of FIG. 4 and FIG. 5.

The vehicle control device 100 according to various exemplary embodiments of the present disclosure may identify that the vehicle maintains a no-load state, during a specified time (e.g., about 60 seconds). The no-load state may include any one of an ignition-off state of the vehicle, a parking state of the vehicle, or a stationary state of the vehicle, or any combination thereof. For example, the vehicle control device 100 may identify the no-load state of the vehicle during the specified time independently of charging or discharging of the vehicle (or the battery 150 of the vehicle).

The vehicle control device 100 according to various exemplary embodiments of the present disclosure may identify a time constant associated with the plurality of battery cells 155, in the no-load state of the vehicle. For example, the plurality of battery cells 155 may be included on battery module. For example, the plurality of battery cells 155 may be included in different battery modules, respectively.

In an exemplary embodiment of the present disclosure, the time constant may include information indicating intensity of a voltage corresponding to each of the battery cells 155 and fluctuation in the voltage over time. For example, the time constant may indicate a time to reach a specific ratio (e.g., about 63.2 percentages) compared to an initial value (or an input value), while an output value (or an output signal) converges to a steady state. For example, the time constant associated with the plurality of battery cells 155 may be identified based on internal resistance and capacitance of the plurality of battery cells 155. The time constant may indicate a parameter associated with the internal resistance and the capacitance. For example, the vehicle control device 100 may infer electrical and chemical properties of the plurality of battery cells 155, using the time constant.

If the vehicle maintains the no-load state during the specified time, the vehicle control device 100 according to various exemplary embodiments of the present disclosure may identify first time constants of each of the battery cells 155. For example, the vehicle control device 100 may identify an average value for the first time constants. For example, the vehicle control device 100 may obtain a comparison dataset indicating a difference between the average value for the first time constants and each of the time constants (e.g., a dataset based on an abnormal behavior battery cell diagnosis technology based on time constant relative comparison of a no-load voltage curve). The difference between the average value and each of the first time constants may indicate a relative difference for each of the first time constants with respect to the average value. For example, the vehicle control device 100 may diagnose a state of each of the battery cells 155, using the comparison dataset.

The vehicle control device 100 according to various exemplary embodiments of the present disclosure may identify a second time constant outside a specified range including the average value among the first time constants, using the comparison dataset. For example, the vehicle control device 100 may identify the first battery cell 151 corresponding to the second time constant. The vehicle control device 100 may diagnose the state of the first battery cell 151 as an abnormal state. The abnormal state may include at least one of an over-discharge state, an overcharge state, an overheating state, or a short circuit state, or any combination thereof.

The vehicle control device 100 according to various exemplary embodiments of the present disclosure may identify a third time constant within the specified range among the first time constants, using the comparison dataset. The vehicle control device 100 may diagnose the state of the second battery cell 152 corresponding to the third time constant as a normal state.

If the vehicle maintains the no-load state during the specified time, the vehicle control device 100 according to various exemplary embodiments of the present disclosure may identify first time constants of each of battery modules. For example, the vehicle control device 100 may identify an average value for time constants. For example, the vehicle control device 100 may obtain a comparison dataset indicating a difference between the average value for the time constants and each of the time constants. For example, the vehicle control device 100 may diagnose a state of each of the battery modules, using the comparison dataset. However, it is not limited thereto.

As described above, while the no-load state of the vehicle is maintained during the specified time, the vehicle control device 100 according to various exemplary embodiments of the present disclosure may identify the state of each of the battery cells 155. For example, the plurality of battery cells 155 may be connected to each other in series or in parallel. Because the plurality of battery cells 155 are connected to each other, if at least one battery cell among the plurality of battery cells 155 is abnormal, this may affect a battery cell adjacent to the at least one battery cell, which is abnormal, through heat transfer. In other words, a micro short circuit (MSC) or an internal short circuit (ISC) due to lithium plating may cause a thermal runaway phenomenon of the plurality of battery cells 155. The vehicle control device 100 may provide a battery management system (or service) configured for monitoring or managing an abnormal battery cell, using the time constant of each of the battery cells 155. The vehicle control device 100 may provide the battery management system configured for monitoring or managing the abnormal battery cell in the battery 150 including the plurality of battery cells 155, thus preventing the thermal runaway phenomenon.

Thus, as described above, the vehicle control device 100 may provide the service configured for managing a problem which occurs in at least one battery cell, thus improving the performance, safety, and/or reliability of the vehicle based on the battery 150. As a result, the vehicle control device 100 may provide users of the vehicle control device 100 with a better driving experience and may improve the safety and reliability of the battery 150, thus having a positive impact on the overall vehicle industry.

Figure 2:
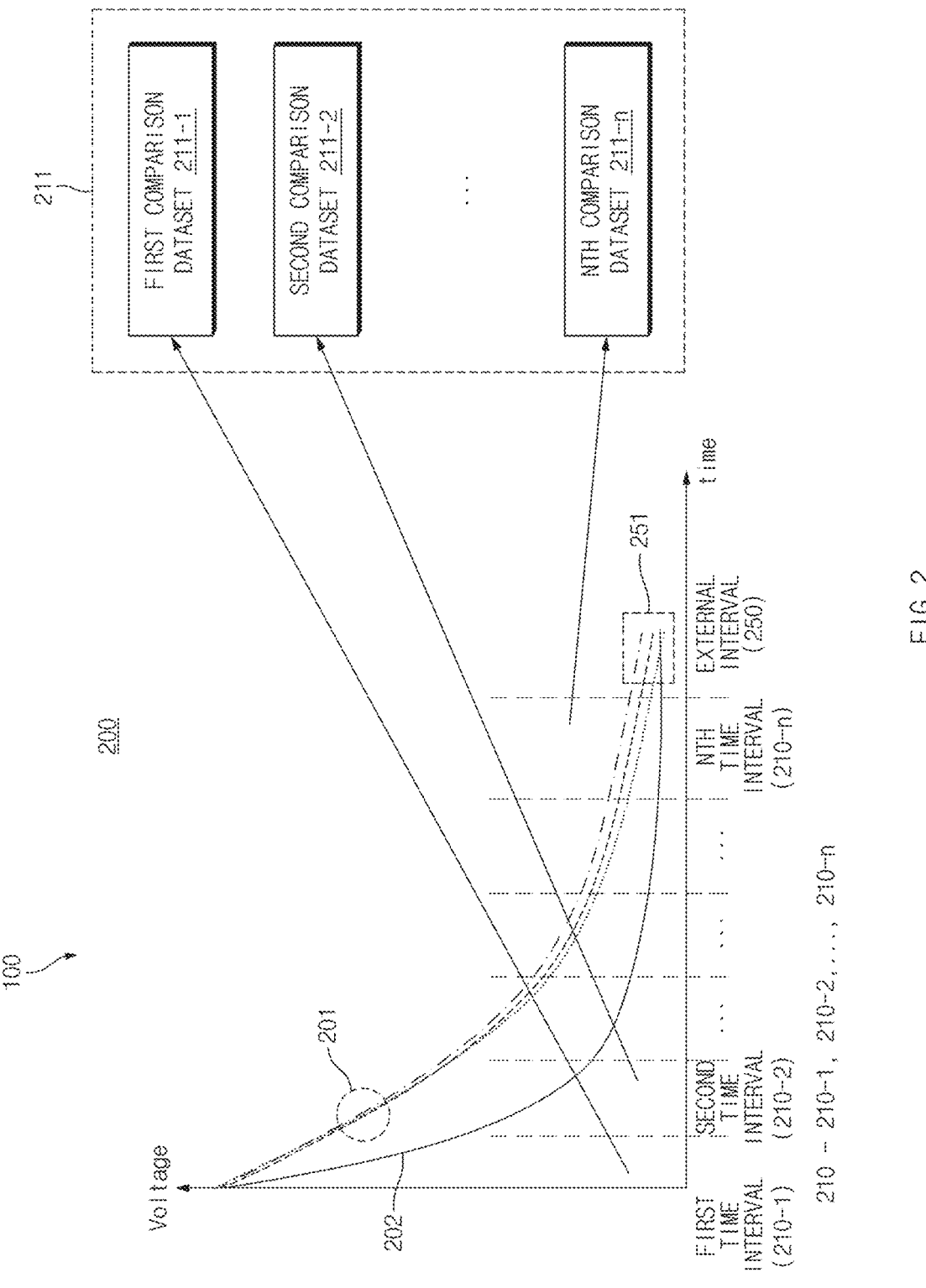
FIG. 2 illustrates an example of an exemplary graph for describing an operation of obtaining comparison datasets associated with a plurality of battery cells in a vehicle control device according to an exemplary embodiment of the present disclosure.

FIG. 2 illustrates an example of an exemplary graph for describing an operation of obtaining comparison datasets associated with a plurality of battery cells in a vehicle control device according to an exemplary embodiment of the present disclosure. A vehicle control device 100 of FIG. 2 may be referred to a vehicle control device 100 of FIG. 1. Referring to FIG. 2, an exemplary graph 200 illustrating a voltage of a battery over time in a no-load state of a vehicle is illustrated. Referring to the graph 200, a voltage of each of battery cells may be represented as a graph (e.g., a graph 201 or a graph 202) with a different slope. For example, the graph 200 may include the graph 201 illustrating voltages of normal battery cells and the graph 202 illustrating a voltage of an abnormal battery cell. The abnormal battery cell may be one or more in number.

Referring to the graph 200, if a vehicle maintains a no-load state during a specified time 210 (e.g., about 60 seconds), the vehicle control device 100 according to various exemplary embodiments of the present disclosure may identify a voltage of each of battery cells (e.g., a plurality of battery cells 155 of FIG. 1) over time.

In an exemplary embodiment of the present disclosure, the vehicle control device 100 may identify a voltage of each of the battery cells (e.g., the plurality of battery cells 155 of FIG. 1), after the specified time 210 (e.g., an external interval 250). For example, the vehicle control device 100 may identify a first voltage corresponding to an abnormal battery cell (e.g., a battery cell associated with the graph 202) and a second voltage corresponding to a normal battery cell (e.g., battery cells associated with the graph 201). For example, a difference between the first voltage and the second voltage may be included in a specified voltage range 251, after the specified time 210 (e.g., the external interval 250). For example, the difference between the first voltage and the second voltage may be outside the specified voltage range 251 during the specified time 210. However, it is not limited thereto.

In other words, in an exemplary embodiment of the present disclosure, the vehicle control device 100 may identify an abnormal battery cell, using the voltage of each of the battery cells during the specified time 210, but may fail to identify an abnormal battery, using the voltage of each of the battery cells identified after the specified time 210 (e.g., the external interval 250). However, a time constant of each of the battery cells includes information (e.g., shapes of the graph 201 and the graph 202) indicating intensity of a voltage and fluctuation in the voltage over time, the vehicle control device 100 may identify an abnormal battery cell using the time constant.

The vehicle control device 100 according to various exemplary embodiments of the present disclosure may identify time constants of each of the battery cells 155, during the specified time 210. For example, the vehicle control device 100 may obtain a comparison dataset (e.g., at least one of comparison datasets 211) indicating a difference between the average value for the time constants and each of the time constants.

The vehicle control device 100 according to various exemplary embodiments of the present disclosure may identify a maximum time constant and a minim time constant among the time constants of each of the battery cells. For example, the vehicle control device 100 may identify other time constants adjacent to at least one of the maximum time constant or the minimum time constant, based on a specified number, among the time constants. The vehicle control apparatus 100 may exclude the other time constants among the time constants. For example, the vehicle control device 100 may identify an average value for the time constants, using the time constants excluding the other time constants. The other time constants may indicate an outlier. The operation of excluding the other time constants in the vehicle control device 100 may include an outlier elimination operation. The vehicle control device 100 may perform the outlier elimination operation, thus improving the accuracy of the average value.

The vehicle control device 100 according to various exemplary embodiments of the present disclosure may divide the specified time 210 into a plurality of time intervals 210-1, 210-2, . . . , and 210-n. The vehicle control device 100 may obtain each of the comparison datasets 211 in the plurality of time intervals 210-1, 210-2, . . . , and 210-n. For example, referring to the graph 200, because the shapes of the graph 201 and the graph 202 are different from each other in each of the time intervals 210-1, 210-2, . . . , and 210-n, different comparison datasets may be obtained. For example, referring to the graph 200, because slopes of the graph 201 and the graph 202 are different from each other in each of the time intervals 210-1, 210-2, . . . , and 210-n, different comparison datasets (or different time constants) may be obtained.

For example, the vehicle control device 100 may obtain a first comparison dataset 211-1 in the first time interval 210-1 among the plurality of time intervals 210-1, 210-2, . . . , and 210-n. For example, the first comparison dataset 211-1 may be represented as Table 1 below.

TABLE 1

| First time interval | Time constant | First comparison dataset |
|---|---|---|
| First battery cell | 7.9 | 98(%) |
| Second battery cell | 8.1 | 101(%) |
| . . . | . . . | . . . |
| Nth battery cell | 7.5 | 102.00(%) |

Referring to Table 1 above, the vehicle control device 100 according to various exemplary embodiments of the present disclosure may identify time constants of each of the battery cells (e.g., the plurality of battery cells 155 of FIG. 1) in the first time interval 210-1. After eliminating the time constant indicating the outlier among the time constants, the vehicle control device 100 may identify an average value of the time constants. The vehicle control device 100 may obtain a comparison dataset indicating a relative difference between the average value and each of the time constants. The comparison dataset may include a normal distribution curve (or Gaussian distribution) based on the average value (e.g., about 100%). The operation of identifying the abnormal battery cell using the normal distribution curve in the vehicle control device 100 will be described below with reference to FIG. 3.

The vehicle control device 100 according to various exemplary embodiments of the present disclosure may obtain a second comparison dataset 211-2 in the second time interval 210-2 among the plurality of time intervals 210-1, 210-2, . . . , and 210-n. For example, the vehicle control device 100 may obtain an nth comparison dataset 211-n in the nth time interval 210-n among the plurality of time intervals 210-1, 210-2, . . . , and 210-n.

The vehicle control device 100 according to various exemplary embodiments of the present disclosure may obtain a plurality of comparison datasets 211 in the plurality of time intervals 210-1, 210-2, . . . , and 210-n. The vehicle control device 100 may identify abnormal battery cells respectively corresponding to the plurality of comparison datasets 211, using each of the comparison datasets 211. The vehicle control device 100 may diagnose a state of at least one of the abnormal battery cells respectively corresponding to the plurality of comparison datasets 211 as an abnormal state.

As described above, if identifying the no-load state of the vehicle during the specified time, the vehicle control device 100 according to various exemplary embodiments of the present disclosure may divide the specified time into a plurality of time intervals. The vehicle control device 100 may respectively obtain comparison datasets in the plurality of time intervals. The vehicle control device 100 may identify abnormal battery cells in each of the time intervals, using the comparison datasets. The vehicle control device 100 may diagnose a state of at least one battery cell included in common among the abnormal battery cells identified in each of the time intervals as an abnormal state. The vehicle control device 100 may identify the abnormal battery cells in each of the time intervals, thus more accurately diagnosing states of the plurality of battery cells.

Figure 3:
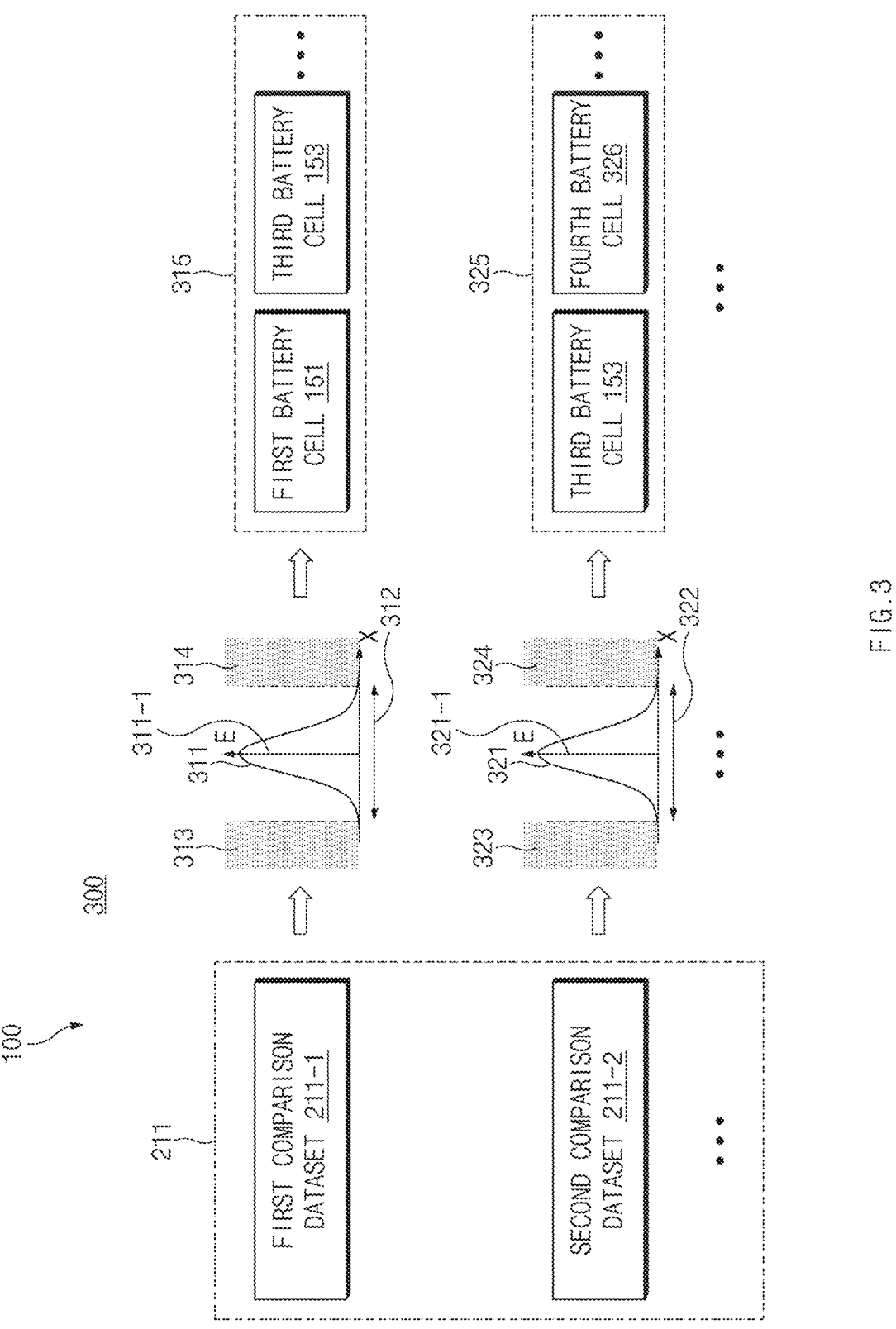
FIG. 3 illustrates an example for describing an operation of identifying an abnormal battery cell among a plurality of battery cells in a vehicle control device according to an exemplary embodiment of the present disclosure.

FIG. 3 illustrates an example for describing an operation of identifying an abnormal battery cell among a plurality of battery cells in a vehicle control device according to an exemplary embodiment of the present disclosure. A vehicle control device 100 of FIG. 3 may be referred to a vehicle control device 100 of FIG. 1.

In an example 300, the vehicle control device 100 may obtain a plurality of comparison datasets 211 during a specified time. For example, the vehicle control device 100 may identify first time constants of each of the battery cells in a first time interval. The vehicle control device 100 may obtain a first comparison dataset 211-1 indicating a difference between an average value for the first time constants and each of the first time constants.

The vehicle control device 100 according to various exemplary embodiments of the present disclosure may obtain a normal distribution curve 311 of the first time constants based on an average value 311-1 corresponding to the first comparison dataset 211-1, using the first comparison dataset 211-1. The vehicle control device 100 may identify a specified range 312 corresponding to the normal distribution curve 311. For example, the specified range 312 may be identified based on a standard deviation corresponding to the normal distribution curve 311.

The vehicle control device 100 according to various exemplary embodiments of the present disclosure may identify a second time constant outside the specified range 312 including the average value 311-1 among the first time constants for each of the battery cells, using the first comparison dataset 211-1.

For example, the second time constant may include in at least one of areas 313 and 314 outside the specified range 312 in the normal distribution curve 311. The areas 313 and 314 may be referred to as error areas.

The vehicle control device 100 according to various exemplary embodiments of the present disclosure may identify a first battery cell (e.g., a first battery cell 151 of FIG. 1) corresponding to the second time constant. The vehicle control device 100 may diagnose the state of the first battery cell as an abnormal state.

The vehicle control device 100 according to various exemplary embodiments of the present disclosure may identify a third time constant within the specified range 312 among the first time constants, using the first comparison dataset 211-1. For example, the vehicle control device 100 may diagnose the state of a second battery cell (e.g., a second battery cell 152 of FIG. 1) corresponding to the third time constant as a normal state.

For example, the first battery cell diagnosed as the normal state may include a change in electrical (or chemical) properties different from other battery cells included in the specified range 312 (e.g., battery cells diagnosed as the normal state). However, it is not limited thereto.

The vehicle control device 100 according to various exemplary embodiments of the present disclosure may identify first abnormal battery cells 315 diagnosed as the abnormal state using the first comparison dataset 211-1 among the plurality of battery cells (e.g., the plurality of battery cells 155 of FIG. 1).

The vehicle control device 100 according to various exemplary embodiments of the present disclosure may identify second abnormal battery cells 325 diagnosed as the abnormal state using a second comparison dataset 211-2 among the plurality of battery cells. For example, the vehicle control device 100 according to various exemplary embodiments of the present disclosure may identify another time constant outside a specified range 322 including an average value 321-1 among time constants for each of the battery cells, using the second comparison dataset 211-2. For example, the other time constant may be included in at least one of areas 323 and 324. The areas 323 and 324 may be referred to as error areas. For example, the vehicle control device 100 may identify an abnormal battery cell (e.g., the second abnormal battery cells 325) corresponding to the other time constant. For example, because different time constants are identified in each of the time intervals, abnormal battery cells identified in each of the time intervals may be different from each other.

If a third battery cell 153 is included in all the first abnormal battery cells 315 and the second abnormal battery cells 325, the vehicle control device 100 according to various exemplary embodiments of the present disclosure may diagnose the state of the third battery cell 153 as the abnormal state. For example, if at least one battery cell (e.g., the first battery cell 151 or a fourth battery cell 326) is included in the first abnormal battery cells 315 or the second abnormal battery cells 325, the vehicle control device 100 may diagnose the state of the at least one battery cell as the normal state.

In other words, the vehicle control device 100 may according to various exemplary embodiments of the present disclosure may obtain a plurality of abnormal battery cells corresponding to each of the datasets 211 using the plurality of comparison datasets 211. The vehicle control device 100 may diagnose the state of at least one battery cell included in common in each of the abnormal battery cells as the abnormal state. However, it is not limited thereto. For example, the vehicle control device 100 may identify the state of at least one battery cell included in at least one of the plurality of abnormal battery cells as the abnormal state.

Figure 4:
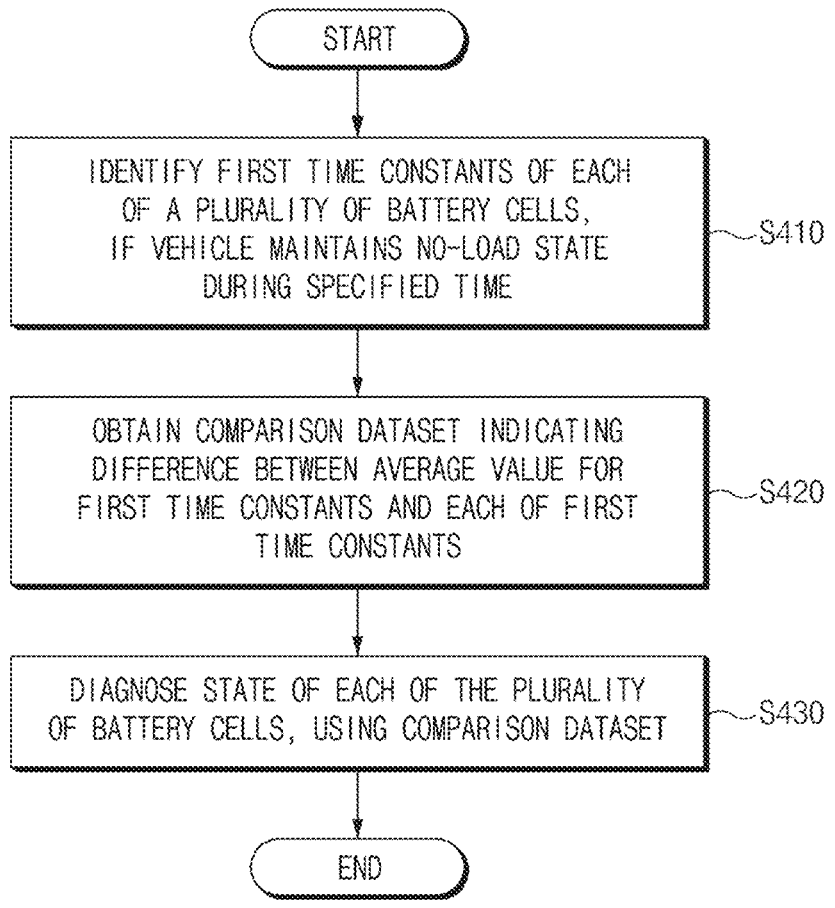
FIG. 4 is a flowchart for describing a vehicle control method according to another exemplary embodiment of the present disclosure.

Hereinafter, a description will be provided in detail of a vehicle control method according to another exemplary embodiment of the present disclosure with reference to FIG. 4. FIG. 4 is a flowchart for describing a vehicle control method according to another exemplary embodiment of the present disclosure.

Hereinafter, it is assumed that a vehicle control device 100 of FIG. 1 is configured to perform a process of FIG. 4. Furthermore, in a description of FIG. 4, an operation referred to as being performed by a device may be understood as being controlled by a processor 110 of the vehicle control device 100. The respective operations of FIG. 4 may be sequentially performed, but are not necessarily sequentially performed. For example, an order of the respective operations may be changed, and at least two operations may be performed in parallel.

Referring to FIG. 4, in S410, the vehicle control method according to various exemplary embodiments of the present disclosure may include identifying first time constants of each of battery cells, if a vehicle maintains a no-load state during a specified time.

For example, the vehicle control method may include identifying the first time constants of each of the battery cells during the specified time, independently of charging of the vehicle (or the plurality of battery cells). The first time constants of each of the battery cells may have different values in accordance with a degree of deterioration in each of the battery cells.

Referring to FIG. 4, in S420, the vehicle control method according to various exemplary embodiments of the present disclosure may include obtaining a comparison dataset indicating a difference between an average value for the first time constants and each of the first time constants.

For example, the vehicle control method may include dividing the specified time into a plurality of time intervals.

For example, the vehicle control method may include dividing the specified time into the plurality of time intervals, each of which includes the same range.

For example, the vehicle control method may include obtaining a plurality of comparison datasets respectively corresponding to the plurality of time intervals.

For example, the vehicle control method may include identifying abnormal battery cells (e.g., first abnormal battery cells 315 and/or second abnormal battery cells 325 of FIG. 3) corresponding to each of the comparison datasets among the plurality of battery cells. For example, the vehicle control method may include identifying a state of at least one battery cell among the abnormal battery cells as an abnormal state.

Referring to FIG. 4, in S430, the vehicle control method according to various exemplary embodiments of the present disclosure may include diagnosing a state of each of the battery cells, using the comparison dataset.

For example, the vehicle control method may include identifying a specified range including the average value among the first time constants using the comparison dataset. For example, the comparison dataset may be represented based on a normal distribution curve. The vehicle control method may include obtaining a normal distribution curve for the first time constants, based on the average value using the comparison dataset. For example, the vehicle control method may include identifying the specified range using a standard deviation corresponding to the normal distribution curve.

For example, the vehicle control method may include identifying a second time constant outside the specified range among the first time constants. The vehicle control method may include identifying a first battery cell corresponding to the second time constant. The vehicle control method may include diagnosing a state of the first battery cell as an abnormal state.

For example, the vehicle control method may include identifying a third time constant within the specified range among the first time constants. The vehicle control method may include diagnosing a state of a second battery cell corresponding to the third time constant as a normal state. However, it is not limited thereto.

The vehicle control method according to various exemplary embodiments of the present disclosure may include obtaining a first comparison dataset in a first time interval among the plurality of time intervals. For example, the vehicle control method may include obtaining a second comparison dataset in a second time interval among the plurality of time intervals.

For example, the vehicle control method may include identifying first abnormal battery cells diagnosed as the abnormal state using the first comparison dataset. Time constants corresponding to the first abnormal battery cells may be included in at least one of area 313 and 314 of FIG. 3.

For example, the vehicle control method may include identifying second abnormal battery cells diagnosed as the abnormal state using the second comparison dataset. Time constants corresponding to the second abnormal battery cells may be included in at least one of area 323 and 324 of FIG. 3.

For example, the vehicle control method may include diagnosing a state of at least one battery cell as the abnormal state, if the at least one battery cell (e.g., a third battery cell 153 of FIG. 3) is included in common in the first abnormal battery cells and the second abnormal battery cells.

For example, the vehicle control method may include diagnosing a state of at least one battery cell as the normal state, if the at least one battery cell (e.g., a fourth battery cell 326 of FIG. 3) is included in the first abnormal battery cells or the second abnormal battery cells. In other words, the vehicle control method may include diagnosing a state of at least one battery cell which is included in the second abnormal battery cells and is not included in the first abnormal battery cells as the normal state. However, it is not limited thereto.

Figure 5:
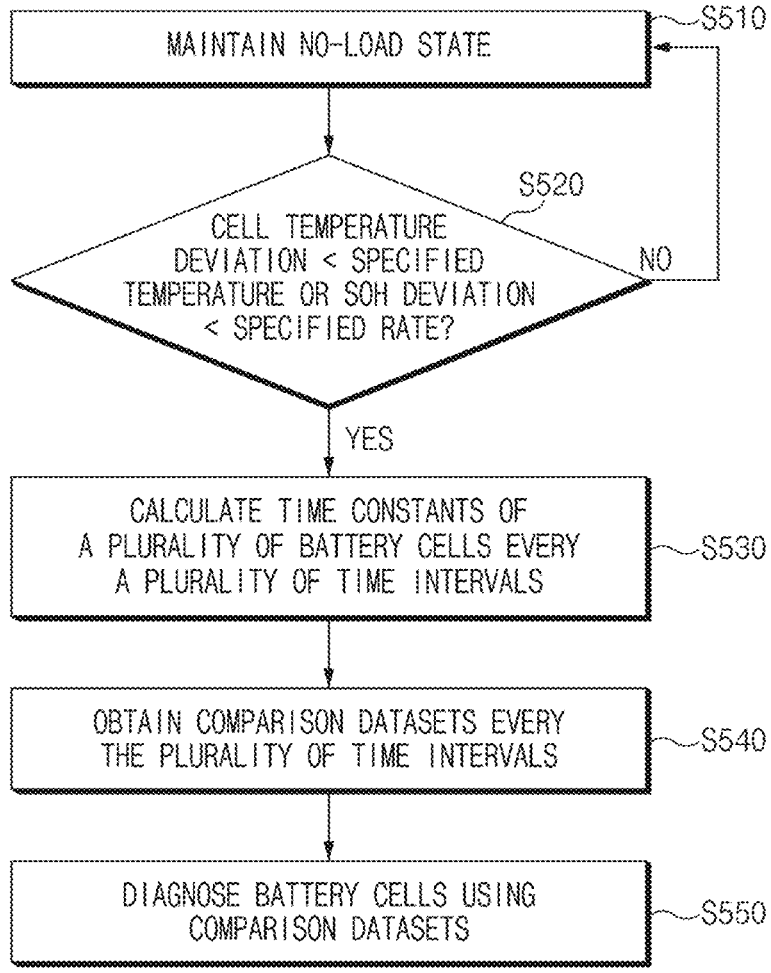
FIG. 5 illustrates an example of a flowchart indicating an operation of identifying an abnormal battery in a vehicle control device according to an exemplary embodiment of the present disclosure.

FIG. 5 illustrates an example of a flowchart indicating an operation of identifying an abnormal battery in a vehicle control device according to an exemplary embodiment of the present disclosure. Hereinafter, it is assumed that a vehicle control device 100 of FIG. 1 performs a process of FIG. 5. Furthermore, in a description of FIG. 5, an operation referred to as being performed by a vehicle control device may be understood as being controlled by a processor 110 of the vehicle control device 100. The respective operations of FIG. 5 may be sequentially performed, but are not necessarily sequentially performed. For example, an order of the respective operations may be changed, and at least two operations may be performed in parallel.

Referring to FIG. 5, in S510, the vehicle control device according to various exemplary embodiments of the present disclosure may identify that a no-load state of a vehicle is maintained. For example, the vehicle control device may identify that the vehicle is maintained in the no-load state during a specified time. The no-load state may include any one of an ignition-off state of the vehicle, a parking state of the vehicle, or a stationary state of the vehicle, or any combination thereof.

Referring to FIG. 5, in S520, the vehicle control device may identify whether a difference between temperatures of each of battery cells is less than or equal to a specified temperature (e.g., about 5 degrees) or whether a difference between states of health (SOHs) of each of the battery cells is less than or equal to a specified rate.

For example, if the vehicle maintains the no-load state during the specified time, the vehicle control device may identify the temperatures of each of the battery cells. For example, the vehicle control device may identify a maximum temperature and a minimum temperature among the temperatures of each of the battery cells. If the difference between the maximum temperature and the minimum temperature is less than or equal to the specified temperature (S520—YES), the vehicle control device may perform S530.

For example, if the vehicle maintains the no-load state during the specified time, the vehicle control device may identify a plurality of SOHs indicating remaining life of each of the battery cells. For example, if a difference between a maximum SOH and a minimum SOH among the plurality of SOHs is less than or equal to the specified rate (S520—YES), the vehicle control device may perform S530.

For example, if the difference between the maximum temperature and the minimum temperature is less than or equal to the specified temperature and the difference between the maximum SOH and the minimum SOH is less than or equal to the specified rate, the vehicle control device may maintain performing S510 (or refrain from performing S530).

For example, if charging a battery, the vehicle control device may further identify whether intensity (e.g., C-rate) of a charging current is less than or equal to specified intensity. If the intensity of the charging current is less than or equal to the specified intensity, the vehicle control device may perform S530. If the intensity of the charging current is greater than the specified intensity, the vehicle control device may perform S510. However, it is not limited thereto.

The vehicle control device according to various exemplary embodiments of the present disclosure may perform S520 and may divide the specified time into a plurality of time intervals before performing S530.

Referring to FIG. 5, in S530, the vehicle control device according to various exemplary embodiments of the present disclosure may be configured to determine time constants of the plurality of battery cells every a plurality of time intervals (e.g., a plurality of time intervals 210-1, 210-2, . . . , and 210-*n* of FIG. 2).

For example, the vehicle control device may be configured to determine an average value of the time constants of the plurality of battery cells. The vehicle control device may identify differences between the average value and the time constants of the plurality of battery cells. The differences between the average value and the time constants of the plurality of battery cells may indicate relative differences of the time constants with respect to the average value.

Referring to FIG. 5, in S540, the vehicle control device according to various exemplary embodiments of the present disclosure may obtain comparison datasets (e.g., comparison datasets 211 of FIG. 2) every the plurality of time intervals.

Referring to FIG. 5, in S550, the vehicle control device according to various exemplary embodiments of the present disclosure may diagnose the battery cells using the comparison datasets.

For example, the vehicle control device may identify a second time constant outside a specified range among first time constants for the plurality of battery cells, using the comparison dataset. The vehicle control device may identify at least one battery cell corresponding to the second time constant. The vehicle control device may diagnose a state of the at least one battery cell as an abnormal state between a normal state or the abnormal state.

As described above, the vehicle control device according to various exemplary embodiments of the present disclosure may provide a user with information indicating the at least one battery cell diagnosed as the abnormal state. For example, the vehicle control device may provide the user with information for notifying the user of the at least one battery cell diagnosed as the abnormal state, thus providing the user with a guide for managing the at least one battery cell.

Figure 6:
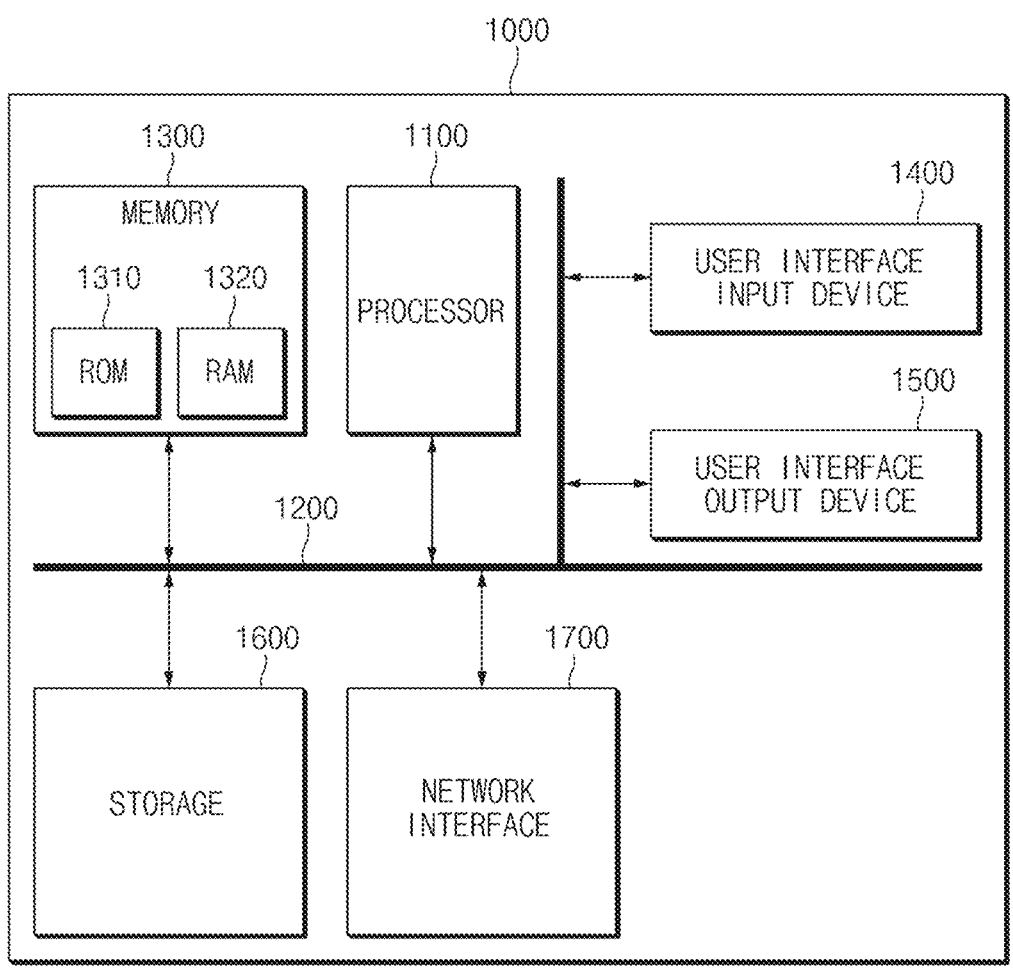
FIG. 6 illustrates a determining system associated with a vehicle control device or a vehicle control method according to an exemplary embodiment of the present disclosure.

FIG. 6 illustrates a computing system associated with a vehicle control device or a vehicle control method according to an exemplary embodiment of the present disclosure.

Referring to FIG. 6, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may monitor battery cells in the no-load state of the vehicle.

The present technology may diagnose states of battery cells using time constants for the battery cells.

Furthermore, the present technology may identify the states of the battery cells using time constants identified in each of time intervals.

Furthermore, various effects ascertained directly or indirectly through the present disclosure may be provided.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus, comprising:
a plurality of battery cells;
a processor; and
a memory operatively connected to the processor,
wherein the processor is configured to:
identify first time constants of each of the battery cells, in response that a vehicle maintains a no-load state during a specified time period;
obtain a comparison dataset indicating a difference between an average value for the first time constants and each of the first time constants; and
diagnose a state of each of the battery cells, using the comparison dataset.

2. The vehicle control apparatus of claim 1, wherein the processor is further configured to:
identify a second time constant outside a specified range including the average value among the first time constants, using the comparison dataset;
identify a first battery cell corresponding to the second time constant; and
diagnose a state of the first battery cell as an abnormal state.

3. The vehicle control apparatus of claim 2, wherein the processor is further configured to:
identify a third time constant within the specified range among the first time constants, using the comparison dataset; and
diagnose a state of a second battery cell corresponding to the third time constant as a normal state.

4. The vehicle control apparatus of claim 3, wherein the processor is further configured to:
identify a first voltage corresponding to the first battery cell and a second voltage corresponding to the second battery cell,
wherein a difference between the first voltage and the second voltage is outside a specified voltage range, during the specified time period and is within the specified voltage range, after the specified time period.

5. The vehicle control apparatus of claim 2, wherein the processor is further configured to:

obtain a normal distribution curve of the first time constants based on the average value, using the comparison dataset; and identify the specified range, using a standard deviation corresponding to the normal distribution curve.

6. The vehicle control apparatus of claim 1, wherein the processor is further configured to:

divide the specified time period into a plurality of time intervals;

obtain a first comparison dataset in a first time interval among the plurality of time intervals;

obtain a second comparison dataset in a second time interval among the plurality of time intervals;

identify first abnormal battery cells diagnosed as an abnormal state using the first comparison dataset among the plurality of battery cells;

identify second abnormal battery cells diagnosed as the abnormal state using the second comparison dataset among the plurality of battery cells;

diagnose a state of a third battery cell as the abnormal state, in response that the third battery cell is included in both the first abnormal battery cells and the second abnormal battery cells; and diagnose the state of the third battery cell as a normal state, in response that the third battery cell is included in either the first abnormal battery cells or the second abnormal battery cells, but not both.

7. The vehicle control apparatus of claim 1, wherein the processor is further configured to:

identify a maximum time constant and a minimum time constant among the first time constants of each of the battery cells;

exclude fourth time constants adjacent to at least one of the maximum time constant or the minimum time constant, based on a specified number, from the first time constants; and identify the average value, using the first time constants excluding the fourth time constants.

8. The vehicle control apparatus of claim 1, wherein the processor is further configured to:

identify temperatures for each of the battery cells, in response that the vehicle maintains the no-load state during the specified time period; and identify the first time constants, in response that a difference between a maximum temperature and a minimum temperature among the temperatures is less than or equal to a specified temperature.

9. The vehicle control apparatus of claim 1, wherein the processor is further configured to:

identify a plurality of states of health (SOHs) indicating remaining life of each of the battery cells, in response that the vehicle maintains the no-load state during the specified time period; and identify the first time constants, in response that a difference between a maximum SOH and a minimum SOH among the plurality of SOHs is less than or equal to a specified rate.

10. The vehicle control apparatus of claim 1, wherein first time constants include information indicating intensity of a voltage corresponding to each of the battery cells and fluctuation in the voltage over time.

11. The vehicle control apparatus of claim 1, wherein the no-load state includes any one of an ignition-off state of the vehicle, a parking state of the vehicle, or a stationary state of the vehicle, or any combination thereof.

12. A vehicle control method, including:

identifying, by a processor, first time constants of each of battery cells, in response that a vehicle maintains a no-load state during a specified time period;

obtaining, by the processor, a comparison dataset indicating a difference between an average value for the first time constants and each of the first time constants; and diagnosing, by the processor, a state of each of the battery cells, using the comparison dataset.

13. The vehicle control method of claim 12, wherein the diagnosing of the state of each of the battery cells includes:

identifying a second time constant outside a specified range including the average value among the first time constants, using the comparison dataset;

identifying a first battery cell corresponding to the second time constant; and diagnosing a state of the first battery cell as an abnormal state.

14. The vehicle control method of claim 13, wherein the diagnosing of the state of each of the battery cells includes:

identifying a third time constant within the specified range among the first time constants, using the comparison dataset; and diagnosing a state of a second battery cell corresponding to the third time constant as a normal state.

15. The vehicle control method of claim 14, further including:

identifying, by the processor, a first voltage corresponding to the first battery cell and a second voltage corresponding to the second battery cell, wherein a difference between the first voltage and the second voltage is outside a specified voltage range, during the specified time period and is within the specified voltage range, after the specified time period.

16. The vehicle control method of claim 13, wherein the identifying of the second time constant includes:

obtaining a normal distribution curve of the first time constants based on the average value, using the comparison dataset; and identifying the specified range, using a standard deviation corresponding to the normal distribution curve.

17. The vehicle control method of claim 12, wherein the diagnosing of the state of each of the battery cells includes:

dividing the specified time period into a plurality of time intervals;

obtaining a first comparison dataset in a first time interval among the plurality of time intervals;

obtaining a second comparison dataset in a second time interval among the plurality of time intervals;

identifying first abnormal battery cells diagnosed as an abnormal state using the first comparison dataset among the plurality of battery cells;

identifying second abnormal battery cells diagnosed as the abnormal state using the second comparison dataset among the plurality of battery cells;

diagnosing a state of a third battery cell as the abnormal state, in response that the third battery cell is included in both the first abnormal battery cells and the second abnormal battery cells; and diagnosing the state of the third battery cell as a normal state, in response that the third battery cell is included in either the first abnormal battery cells or the second abnormal battery cells, but not both.

18. The vehicle control method of claim 12, wherein the identifying of the comparison dataset includes:

identifying a maximum time constant and a minimum time constant among the first time constants of each of the battery cells;

excluding fourth time constants adjacent to at least one of the maximum time constant or the minimum time constant, based on a specified number, from the first time constants; and identifying the average value, using the first time constants excluding the fourth time constants.

19. The vehicle control method of claim 12, wherein the identifying of the first time constants includes:

identifying temperatures for each of the battery cells, when the vehicle maintains the no-load state during the specified time period; and identifying the first time constants, in response that a difference between a maximum temperature and a minimum temperature among the temperatures is less than or equal to a specified temperature.

20. The vehicle control method of claim 12, wherein the identifying of the first time constants includes:

identifying a plurality of states of health (SOHs) indicating remaining life of each of the battery cells, in response that the vehicle maintains the no-load state during the specified time period; and identifying the first time constants, in response that a difference between a maximum SOH and a minimum SOH among the plurality of SOHs is less than or equal to a specified rate.

* * * * *